United States Patent [19]
Van Roemburg et al.

[11] Patent Number: 5,712,940
[45] Date of Patent: Jan. 27, 1998

[54] OPTOELECTRONIC DEVICE WITH A COUPLING BETWEEN A SEMICONDUCTOR LASER MODULATOR OR AMPLIFIER AND TWO OPTICAL GLASS FIBRES

[75] Inventors: Remigius S. M. Van Roemburg; Lukas F. Tiemeijer, both of Eindhoven, Netherlands

[73] Assignee: U.S. Philips Corporation, Tarrytown, N.Y.

[21] Appl. No.: 595,533

[22] Filed: Feb. 2, 1996

[30] Foreign Application Priority Data

Feb. 10, 1995 [EP] European Pat. Off. ............ 95200323

[51] Int. Cl.[6] .................................................. G02B 6/36
[52] U.S. Cl. ......................... 385/93; 385/33; 385/49; 385/52; 385/88
[58] Field of Search ........................... 385/33, 34, 35, 385/39, 49, 52, 88, 89, 92, 93, 94; 372/43, 50

[56] References Cited

U.S. PATENT DOCUMENTS

| | | | |
|---|---|---|---|
| 4,926,430 | 5/1990 | Isono | 372/33 |
| 4,981,335 | 1/1991 | Gaebe | 385/33 X |
| 4,995,696 | 2/1991 | Nishimura et al. | 385/33 X |
| 5,291,571 | 3/1994 | Kunikane et al. | 385/93 |
| 5,351,330 | 9/1994 | Jongewaard | 385/93 |
| 5,353,294 | 10/1994 | Shigeno | 372/43 |

FOREIGN PATENT DOCUMENTS

0590393A1  4/1994  European Pat. Off. ............ 385/33 X

*Primary Examiner*—Brian Healy
*Attorney, Agent, or Firm*—Daniel E. Tierney

[57] ABSTRACT

An optoelectronic device with an optoelectronic module containing a semiconductor diode laser device and, in the radiation path (S) on either side of the semiconductor diode laser device, in that order, a first lens, an optical component, in particular an optical isolator, a second lens, and an optical glass fiber. The second lens and the glass fiber are arranged in a sub-module. The optical component is present in the sub-module and the first lens outside it, and the module is provided with means for fastening the sub-module to the module at an adjustable angle relative to the radiation path. Said means preferably comprise a membrane and radially adjustable clamping means.

20 Claims, 2 Drawing Sheets

OPTOELECTRONIC DEVICE WITH A COUPLING BETWEEN A SEMICONDUCTOR LASER MODULATOR OR AMPLIFIER AND TWO OPTICAL GLASS FIBRES

BACKGROUND OF THE INVENTION

The invention relates to an optoelectronic device comprising an optoelectronic module which comprises at least a semiconductor diode laser modulator or amplifier, referred to as amplifier hereinafter for short, and in the radiation path on either side of the amplifier in that order a first lens, an optical component, in particular an optical isolator, a second lens, and an optical glass fiber, the second lens and the glass fiber forming part of a tubular sub-module.

Such devices are widely used in systems for optical glass fiber communication and form an attractive alternative for the combination of a detector and a laser in the on-line amplification of signals. They may also be placed immediately, or at least shortly behind a laser, in which case they are called booster amplifiers.

Such a device is known from U.S. Pat. No. 4,995,696 published 26-2-1991. The module shown therein (see FIGS. 3, 5, 6) comprises in a central position an amplifier on a holder to which two plate-shaped holders, each having an opening aligned with the amplifier and a lens holder with a (spherical) lens, are connected. On either side of the holder with the amplifier and in the radiation path, there are tubular sub-modules in which a second lens and an optical glass fiber are accommodated. An optical component, in this case an optical isolator, is present in the radiation path between the holder for the amplifier and each glass-fiber holder.

A disadvantage of the known device is that the coupling efficiency between amplifier and glass fibers is comparatively low. This problem often arises in devices with a comparatively high number of components, such as the known device in which not only the amplifier, but also two glass fibers, four lenses, and two isolators are present. In addition, the manufacture of such a device with a comparatively great number of alignments between the components thereof is difficult. A reduction of the number of components is not very well possible. It is indeed possible to leave out the two lenses adjoining the glass fiber when the lenses adjoining the amplifier are aspherical. The problems mentioned above, however, still occur then. Leaving out the optical component, i.e. the isolators, is indeed possible, but it results in an inferior device which can be used in a limited number of applications only in which the sensitivity to feedback is low.

SUMMARY OF THE INVENTION

The invention has for its object to provide a device of the kind mentioned in the opening paragraph which is not subject to the disadvantages mentioned above, or at least to a much lesser degree, and which accordingly has a high coupling efficiency and a low sensitivity to feedback. Another object is to obtain such a device which is easy to manufacture.

According to the invention, a device of the kind mentioned in the opening paragraph is for this purpose characterized in that the optical component is present in the sub-module, the first lens is present outside the sub-module, and the module is provided with means for fastening the sub-module to the module at an adjustable angle relative to the radiation path. The inclusion of the optical component in the sub-module simplifies the manufacture and promotes a good coupling efficiency. This is because the sub-module can be manufactured from a component available for glass fiber systems having the following parts which are mutually aligned with high accuracy: an input glass fiber, a lens, an optical component (in particular, for example, an optical isolator), a further lens, and an output glass fiber. For the present purpose, the input glass fiber and the adjoining lens are removed from said component. The first lens is included in the module outside the sub-module. These aspects of the invention are based on the surprising recognition that the coupling efficiency and the ease of manufacturing are an optimum when only two components (here the amplifier and the sub-module) need be mutually aligned by means of a lens in the module. In addition, the device according to the invention has a high coupling efficiency owing to the presence of means for fastening the sub-module to the module at an adjustable angle relative to the radiation path. This aspect is based on the following surprising recognitions: on the one hand that the x- and y-directions (i.e. directions perpendicular to the radiation path) have the lowest tolerance during the mutual alignment of the sub-module and the amplifier by means of a lens here. On the other hand, said tolerances become considerably wider in that the angle enclosed by the sub-module with the radiation path is rendered accurately adjustable in the device, thanks to the comparatively great length of the optical component.

In a preferred embodiment of a device according to the invention, the means for fastening the sub-module to the module at an adjustable angle relative to the radiation path comprise in that order: a membrane which is provided with an opening and to which the end of the sub-module adjoining the optical component is fastened, and radially adjustable clamping means by which the sub-module is held fixed adjacent its other end. The end of the sub-module adjoining the membrane is thus fastened to the module in a secure and stable manner. The sub-module may now be simply pivoted about said end while nevertheless the x, y, and z positions of that end remain substantially the same. The radially adjustable clamping means adjacent the other end of the sub-module render it possible to adjust the angle enclosed by the sub-module and the radiation path such that the coupling efficiency is a maximum. At the same time, this other end can be fixed thereby and fastened to the module.

In a major embodiment of a device according to the invention, the submodule is arranged in a, preferably cylindrical, bush of which one end is provided with the membrane having an opening, which is provided with the radially adjustable clamping means at the other end, and which is provided with a flange for fastening to the module. The submodule can be handled, aligned, and fixed particularly easily in this manner. The bush is preferably fastened to the module at the area of the flange by means of (laser) welding. The radially adjustable clamping means preferably comprise at least two, preferably three or four bolts which are present in threaded hole in the bush.

Preferably, the module comprises a box of which at least one side face is provided with at least one row of electrically insulated lead-through conductors, within which the amplifier, the first lens, and a portion of the sub-module are present and of which box a side face directed towards the amplifier is provided with an opening through which the submodule partly projects from the box. Such boxes of the DIL (=Dual In Line) or BF (=ButterFly) type are highly suitable for many glass fiber communication systems. Since the sub-module is allowed to project from the box for a (major) portion, the sub-module can be comparatively long while nevertheless the box is comparatively compact, or at least has standard dimensions. The optical component preferably is an optical isolator, which renders the device according to the invention highly suitable for applications in which a low feedback of the radiation amplified and to be amplified is required. The ease of manufacture of a device according to the invention is strongly improved thereby since the alternative for an optical isolator is formed by the provision of substantially all components of the device according to the invention with antireflection means of high quality.

The device according to the invention is particularly suitable for optical isolators which are not sensitive to polarization of the radiation to be amplified. Such an isolator, which necessarily comprises two double-refraction crystals, is comparatively big owing to the presence of these crystals. In practice, the length of such an isolator is approximately 25 mm, while its diameter lies between approximately 5 and 10 mm with an aperture which is smaller than 1 mm, for example 0.5 mm. As was noted above, a device according to the invention is particularly suitable for such comparatively big optical components. Provided with a polarization-insensitive isolator, the device according to the invention is particularly suitable for being arranged behind a very long glass fiber. The polarization of the radiation to be amplified is undefined in such a long glass fiber. This is not a disadvantage for a device with a polarization-insensitive isolator. The input glass fiber then need not be provided with means by which the polarization of the radiation to be amplified can be checked or adjusted.

The coupling efficiency and the stability thereof, as well as the ease of manufacture of a device according to the invention can be strongly improved further in that the amplifier is present on a holder which comprises a plate on each side of the amplifier with an opening aligned with the amplifier and with a bush within which a lens holder with the first lens is present on said plate, while the end of the lens holder adjoining the plate is provided with a flange and the bush is provided with at least one opening adjacent the plate, preferably with three openings. Preferably, the holder is a single component made of a uniform material which has a satisfactory heat conduction, such as stainless steel. The lens may be readily aligned with the amplifier in radial direction in that the flange of the lens holder is shifted over the plate. Fixation is achieved by means of (laser) welds through the opening(s) in the bush. When the lens holder comprises a further bush, the alignment and fixation of the lens in the z-direction may also be madfly realised. Further particulars on these modifications can be found in the simultaneously filed application PHN 15.181.

BRIEF DESCRIPTION OF THE DRAWINGS

The invention will be explained in more detail with reference to an embodiment shown in the drawing.

The Figures are diagrammatic and not true to scale. Corresponding components have generally been given the same reference numerals in the Figures.

DETAILED DESCRIPTION OF THE PREFERRED EMBODIMENTS

Figure 1:
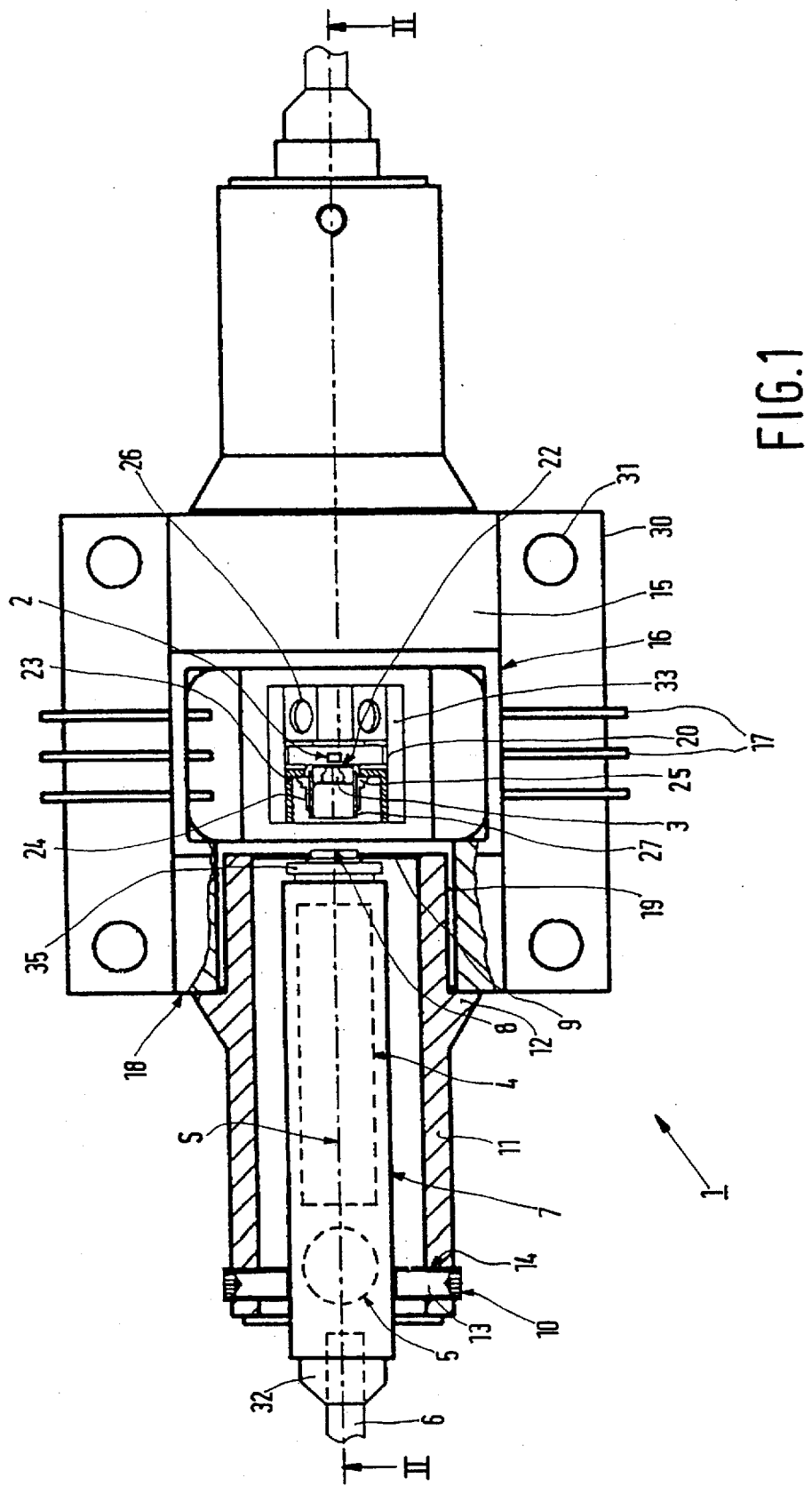
FIG. 1 diagrammatically shows a plan view, partly cut away, of an optoelectronic device according to the invention, and FIG. 2 diagrammatically and in cross-section shows the device of FIG. 1 taken on the line II—II.
Figure 2:
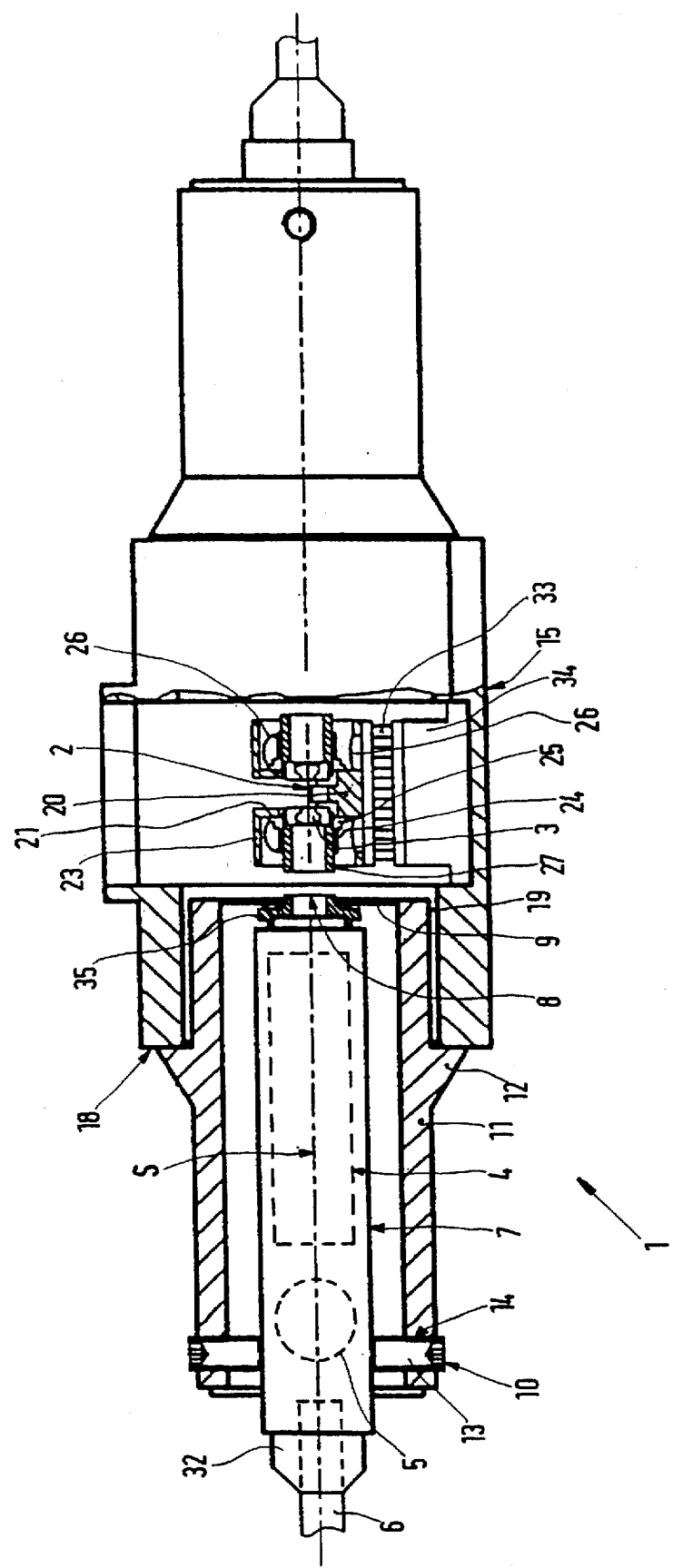

FIG. 1 is a diagrammatic plan view, partly cut away, of an optoelectronic device according to the invention. FIG. 2 shows the device of FIG. 1 diagrammatically and in cross-section taken on the line II—II. The device comprises a module 1 which contains a semiconductor diode laser amplifier 2 and in the radiation path S on either side of the amplifier 2 in that order a first lens 3, an optical component 4, here an optical isolator 4, a second lens 5, and an optical glass fiber 6. The second lens 5, indicated diagrammatically only in the Figures, and the glass fiber 6 are arranged in a tubular sub-module 7.

According to the invention, the optical component 4, here the optical isolator 4, is present in the sub-module 7 while the first lens 3 is outside this sub-module, and the module 1 is provided with means 9, 10 for fastening the sub-module 7 to the module 1 at an adjustable angle relative to the radiation path S. The inclusion of the optical insulator 4 in the sub-module 7 increases the coupling efficiency and simplifies the manufacture of a device according to the invention because the sub-module 7 can be manufactured separately. The coupling efficiency and ease of manufacture are an optimum because only the amplifier 2 and the sub-module 7 need be mutually aligned by means of the first lens 3 in the module 1. Said means 9, 10 here comprise a membrane 9 provided with an opening 8, to which membrane the end of the sub-module 7 adjoining the isolator 4 is fastened. They further comprise radially adjustable clamping means 10, here in the form of four bolts 13 in threaded holes 14 in the module. The sub-module 7, which here has a square cross-section, is fixed adjacent the glass fiber 6 thereby and fastened to the module 1. The alignment tolerance in radial direction of the sub-module 7 is increased thereby, which benefits the coupling efficiency.

The sub-module 7 is here present in a (cylindrical) bush 11 to which the membrane 9 is fastened adjacent an end. The bush 11 also comprises the radially adjustable clamping means 10, here the four bolts 13. The bush 11, and thus the sub-module 7, is fastened to the module 1 by means of a flange 12 at the bush 11, which flange is welded to the module 1.

The module 1 here comprises a box 15 of the so-called Butterfly type. Two side faces 16 of the box 15 are provided with a row of electrically insulated lead-through conductors 17. The electrical connections between the conductors 17 and the amplifier 23, and any further optoelectronic components present, is not shown in the Figures. The box 15 is particularly compact: its length, width, and height are no more than approximately 25, 15 and 15 mm, respectively. The approximately 2 mm thick walls of the box 15 comprise Kovar or Fernleo, i.e. iron, cobalt and nickel alloys, as does a lid which is not shown in the drawing. A bottom plate 30 projecting from the box 15 is provided with holes 31 for further fastening. A major portion of the sub-module 7 projects through an opening 19 in the side face 18 from the box 15. The sub-module 7 is comparatively big, in particular long, because the optical isolator 4 in this example is not sensitive to the polarization of the radiation to be amplified. The dimensions of the sub-module 7, which is rectangular here, are: length 30 mm, width and height 5 mm. The presence of two comparatively long double-refraction crystals in such an isolator 4 is responsible for these dimensions. The portion of the glass fiber 6 issuing from the sub-module 7 is provided with a cord anchorage 32. It is further noted that the components of the module 1 are substantially cylindrical except for the box 15 and the sub-module 7.

In this example, the amplifier 2 is present on a holder 20 which comprises a plate 21 on either side of the amplifier 2 with an opening 22 and a bush 23. Within the bush 23 and on the plate 31 there is a lens holder 24 for the first lens 3.

The bush 23 comprises at least one opening 25, here three openings 25 mutually offset by 120° each time, adjacent the plate 21. This renders the lens holder 24 accessible for fastening to the plate 21. The flange 26 is fastened by means of (laser) welds. The holder 20 provides a good heat removal which is as symmetrical as possible, so that the device has a high and stable coupling efficiency. The great mechanical robustness of the holder 20 also contributes to this and facilitates manufacture. The first lens 3 may be readily aligned in radial direction through shifting of the lens holder 24 over the plate 21. Alignment in axial direction takes place in that a bush 27 with the first lens 3 is shifted in the lens holder 24 before being fastened thereto. The bush 27 in the lens holder 24 has for this purpose a smaller diameter than the opening 22 in the plate 21.

The present embodiment of the device is manufactured as follows (see FIGS. 1 and 2). The amplifier 2 is fastened on the holder 20 together with possible other (opto)electronic components. Then the first lens 3 in the lens holder 24 is aligned relative to the amplifier 2. This is done for the x, y-directions through shifting of the lens holder 24 over the plate 21, and for the z-direction through shifting of the bush 27 in the lens holder 24. Then the bush 27 is fastened to the lens holder 24 and the flange 26 of the lens holder 24 is fastened to the plate 21 by means of laser welding through the openings 25 in the bush 23. This process takes place at each side of the amplifier 2, i.e. twice. The holder 20 is then fastened on a Peltier cooler 33 which is fastened on a heat sink 34, which is in its turn fastened on the bottom plate 30 of the box 15. Electrical connections not shown in the drawing are then provided between the amplifier 2, plus any other (opto)electronic components which may be present, and the electrical conductors 17, for example in the form of wire connections.

The sub-module 7 is manufactured from a component (not shown in the Figures) which comprises the glass fiber 6, the first lens 3, the optical isolator 4, a further lens, and a further glass fiber in that the further lens and further glass fiber are removed therefrom. The bush 11 is provided at one end with the membrane 9 with opening 8, and adjacent the other end with threaded holes 14 in which the bolts 13 are present. The sub-module 7 is then welded to the membrane 9 by means of a ring 35.

Then the bush 11 with the sub-module 7 is placed in the opening 19 of the box 15 and aligned relative to the first lens 3 or the amplifier 2. In this alignment, it is ascertained by means of a camera whether a parallel beam issues from the sub-module 7. Then the bush 11 with the sub-module 7 is fastened to the box 15 by means of laser welds at the area of the flange 12. The angle enclosed by the sub-module 7 and the radiation path S is subsequently adjusted through a coordinated turning of the bolts 13 such that the coupling efficiency is a maximum. Finally, the sub-module 7 is fixed adjacent the glass fiber 6 and fastened to the module 1. This process is repeated at the other side of the amplifier 2, after which the module 1 is ready for use.

The invention is not limited to the embodiment described, many modifications and variations being possible to those skilled in the art within the scope of the invention. Thus materials or dimensions other than those mentioned in the example may be used. It is especially noted that the optical component may be a filter, beam splitter, etc. instead of an isolator. The device may advantageously comprise also other optoelectronic components such as a photodiode, or passive electronic components such as resistors and capacitors.

What is claimed is:

1. An optoelectronic device comprising an optoelectronic module which comprises at least a semiconductor diode laser device and, in the radiation path (S) on either side of the semiconductor diode laser device, a first lens, an optical component, a second lens, and an optical glass fiber, the second lens and the glass fiber forming part of a sub-module, the optical component being present in the sub-module, the first lens being present outside the sub-module, and the module being provided with means for fastening the sub-module to the module, the fastening means providing for adjustment of the angle of the sub-module relative to the radiation path (S).

2. An optoelectronic device as claimed in claim 1, wherein the means for fastening the sub-module to the module at an adjustable angle relative to the radiation path (S) comprises a membrane which is provided with an opening and to which the end of the sub-module adjoining the optical component is fastened, and comprises radially adjustable clamping means by which the sub-module is held fixed adjacent its other end.

3. An optoelectronic device as claimed in claim 2, wherein the sub-module is arranged in a bush of which one end is provided with the membrane having an opening, which is provided with the radially adjustable clamping means at the other end, and which is provided with a flange for fastening the bush to the module.

4. An optoelectronic device as claimed in claim 3, wherein the radially adjustable clamping means comprises at least two bolts which are present in threaded holes in the bush.

5. An optoelectronic device as claimed in claim 4, wherein the module comprises a box of which at least one side face is provided with at least one row of electrically insulated lead-through conductors, within which box the semiconductor diode laser device, the first lens, and a portion of the sub-module are present, and of which box a side face is directed towards the semiconductor diode laser device and is provided with an opening through which the sub-module partly projects from the box.

6. An optoelectronic device as claimed in claim 5, wherein the optical component is an optical isolator.

7. An optoelectronic device as claimed in claim 6, wherein the optical isolator is not sensitive to the polarization of radiation.

8. An optoelectronic device as claimed in claim 7, wherein the semiconductor diode laser device is present on a holder which comprises a plate on each side of the semiconductor diode laser device with an opening aligned with the semiconductor diode laser device and with a bush within which a lens holder for the first lens is present on said plate, while the end of the lens holder adjoining the plate is provided with a flange and the bush is provided with at least one opening adjacent the plate.

9. An optoelectronic device as claimed in claim 8, wherein the lens holder comprises a further bush which fits with sliding possibility in the lens holder and has a diameter smaller than the opening in the plate.

10. An optoelectronic device as claimed in claim 1, wherein the semiconductor diode laser device comprises a semiconductor diode laser amplifier.

11. An optoelectronic device as claimed in claim 1, wherein the semiconductor diode laser device comprises a semiconductor diode laser modulator.

12. An optoelectronic device as claimed in claim 2, wherein the radially adjustable clamping means comprises at least two bolts which are present in threaded holes in the bush.

13. An optoelectronic device as claimed in claim 1, wherein the module comprises a box of which at least one side face is provided with at least one row of electrically insulated lead-through conductors, within which box the semiconductor diode laser device, the first lens, and a portion of the sub-module are present, and of which box a side face is directed towards the semiconductor diode laser device and is provided with an opening through which the sub-module partly projects from the box.

14. An optoelectronic device as claimed in claim 2, wherein the module comprises a box of which at least one side face is provided with at least one row of electrically insulated lead-through conductors, within which box the semiconductor diode laser device, the first lens, and a portion of the sub-module are present, and of which box a side face is directed towards the semiconductor diode laser device and is provided with an opening through which the sub-module partly projects from the box.

15. An optoelectronic device as claimed in claim 3, wherein the module comprises a box of which at least one side face is provided with at least one row of electrically insulated lead-through conductors, within which box the semiconductor diode laser device, the first lens, and a portion of the sub-module are present, and of which box a side face is directed towards the semiconductor diode laser device and is provided with an opening through which the sub-module partly projects from the box.

16. An optoelectronic device as claimed in claim 1, wherein the optical component is an optical isolator.

17. An optoelectronic device as claimed in claim 13, wherein the optical component is an optical isolator.

18. An optoelectronic device as claimed in claim 1, wherein the semiconductor diode laser device is present on a holder which comprises a plate on each side of the semiconductor diode laser device with an opening aligned with the semiconductor diode laser device and with a bush within which a lens holder for the first lens is present on said plate, while the end of the lens holder adjoining the plate is provided with a flange and the bush is provided with at least one opening adjacent the plate, preferably with three openings.

19. An optoelectronic device as claimed in claim 16, wherein the semiconductor diode laser device is present on a holder which comprises a plate on each side of the semiconductor diode laser device with an opening aligned with the semiconductor diode laser device and with a bush within which a lens holder for the first lens is present on said plate, while the end of the lens holder adjoining the plate is provided with a flange and the bush is provided with at least one opening adjacent the plate, preferably with three openings.

20. An optoelectronic device as claimed in claim 13, wherein the semiconductor diode laser device is present on a holder which comprises a plate on each side of the semiconductor diode laser device with an opening aligned with the semiconductor diode laser device and with a bush within which a lens holder for the first lens is present on said plate, while the end of the lens holder adjoining the plate is provided with a flange and the bush is provided with at least one opening adjacent the plate, preferably with three openings.

* * * * *